United States Patent Office 2,993,100
Patented July 18, 1961

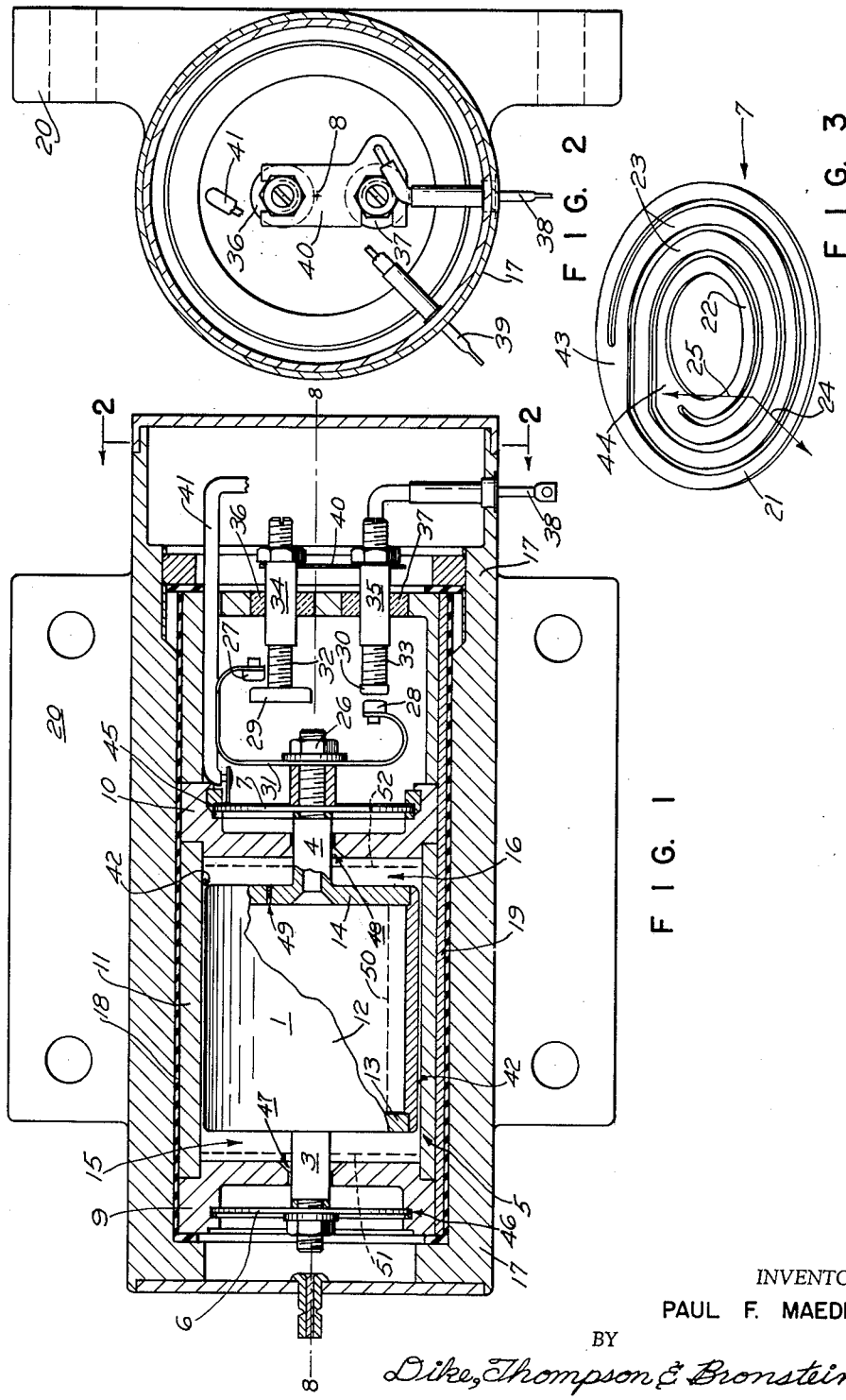

2,993,100
INERTIAL DETECTOR
Paul F. Maeder, Rumford, R.I., assignor to Speidel Corporation, Providence, R.I., a corporation of Rhode Island
Filed Mar. 13, 1958, Ser. No. 721,193
7 Claims. (Cl. 200—61.53)

The present invention relates to acceleration-responsive devices and, in one particular aspect, to improved accelerometer instruments which provide output signals accurately characterizing predetermined acceleration conditions while withstanding and remaining non-responsive to certain severe environmental conditions.

Acceleration forces experienced under influences of gravity, changing velocities, vibration, shock and the like, are commonly measured for such purposes as analyzing structures or initiating control operations. Illustrative of these are the dynamic measurements of vibratory displacements of aircraft control surfaces or structural members, and the gauging of accelerations associated with projectiles or missiles. The magnitude of these forces must in most instances be correlated with direction to convey fullest information, and the sensing devices employed are thus often designed to achieve responses only along isolated axes. One simple form of accelerometer of this general character utilizes an inertia member or mass resiliently restrained against deflections along a single suspension axis which is fixed in relation to a casing or support, the relative displacements between the inertia member and support signifying occurrences of accelerations having components aligned with the suspension axis. Sensitivity to very low level accelerations can be approached with such devices when the supported mass is relatively large and the resilient restraint along the deflection axis is slight and unattended by friction effects. To this end, it has been known to utilize such aids as forced-air bearing support for the mass in reducing friction, and it has been another practice to employ supports in the form of flat springs or diaphragms in substitution for conventional bearings and springs to take advantage of the desirable radial stiffness and axial resilience which they exhibit. In yet other arrangements, the supported mass is made relatively light, enabling the use of sensitive support springs which can safely assume the slight radial loading, and a liquid is distributed within the instrument casing to dampen responses to certain vibratory accelerations by virtue of a pumping action and thereby to occasion an apparent increase in effective mass along the deflection axis under such vibration conditions. Comparable damping may be realized also through fluid shear or magnetic damping effects.

In practicing either magnetic or dense fluid damping, it is found that the response characteristics are acutely variable with temperature and that temperature-compensating arrangements must be employed if precision operation is to be approached over broad ranges of environmental temperatures. Bulk, complexity and manufacturing costs are affected by associated compensation equipment, as they are also by provision of devices such as air bearings which require continuous forced supplies. Through the present teachings, however, thermally-induced errors may be reduced to wholly negligible values in sensitive acceleration-responsive devices which are of particularly simple and diminutive mechanical constructions and which incorporate multi-purpose pneumatic elements of critical proportions. Optimized performance characteristics accrue from certain restraints offered by trapped compressible gaseous fluid which aid sensitive return springs, and from self-generated gas film support, and from gaseous fluid damping against shock injuries, as well as from important frequency tuning of the pneumatic elements which improves the response of the suspended mass system.

Accordingly, it is one of the objects of the present invention to provide improved inertial detector apparatus of simple mechanical construction which is both highly sensitive and immune to effects of ambient temperature variations.

It is another object to provide improved inertial detection apparatus which is of economical manufacture in small size and total mass and which accurately senses acceleration effects within minute ranges while possessing immunity to shock damage.

A yet further object is to provide improved accelerometer apparatus wherein critically resonant gaseous fluid volumes advantageously modify dynamic response characteristics of a suspended inertial member and aid restraint thereof in arrangements which are substantially insensitive to thermal conditions.

By way of a summary account of this invention in one of its aspects, I provide an elongated cylindrical mass with trunnions or shafts extending axially from both ends thereof and dispose this mass within a casing forming a yet further elongated cylinder which is air-tight except for end openings just accommodating the shafts. Outside the casing are positioned two flat spiral springs which possess radial stiffness and sensitive axial flexibility, each of these springs being fixed with and supporting a different one of the trunnions in relation to the casing such that the cylindrical mass and its trunnions may be delicately displaced axially against restraint of the springs without attendant frictional engagement with the casing. The cylindrical mass is dimensioned to provide a close but non-contacting fit within the cylinder, thereby separating the cylinder into two substantially isolated hollow chambers which are each filled with a dry compressible nitrogen gas. Dimensions of the gas chambers are fixed to establish the resonant frequency of the mass in combination with the two gas volumes at a value approximately five times the resonant frequency of the mass and support spring combination along the lateral directions of flexibility, whereby the suspended mass is dampened to preclude peaks of unwanted axial travel under near-resonant vibration conditions and is pneumatically isolated against damage under shock and other severe loading conditions.

Although the features of this invention which are believed novel are set forth in the appended claims, greater detail of the invention in its preferred embodiments and the further objects and advantages thereof may be readily comprehended through reference to the following decription taken in connection with the accompanying drawings, wherein:

FIGURE 1 depicts a longitudinal cross-section of a sensitive accelerometer unit including gaseous resonance detuning provisions which improve response characteristics and isolate the suspension from effects of shock and vibration;

FIGURE 2 represents a transverse cross-section of the unit of FIGURE 1 taken along a section line 2—2; and FIGURE 3 is a pictorial view of one form of suspension spring which may be used in the FIGURE 1 apparatus.

With reference to the FIGURE 1 illustration, the acceleration-responsive unit there includes a right cylindrical seismic mass element 1 which is of a sealed hollow construction affording both a diameter and axial length which are large in relation to the total mass. Aligned axial trunnions 3 and 4 project from opposite ends of the mass, and these are shown to be coupled with an inner casing 5 through flat spiral springs 6 and 7, respectively, whereby the mass 1 is laterally confined but axially deflectable along the suspension axis 8—8 of the casing. Preferably, the casing 5 is fabricated from two end brackets 9 and 10 and an intermediate hollow cylindrical sleeve member 11, which construction facilitates assembly and adjustment, and the seismic mass unit is likewise preferably comprised of a sub-assembly hollow cylinder element 12 fixed and sealed intermediate the end pieces 13 and 14 which are integral with the shafts 3 and 4, respectively. Each of the inner casing end brackets is provided with a central aperture of diameter very minutely exceeding that of the shafts 3 and 4 which pass therethrough, and the support springs 6 and 7 normally sustain the load of mass 1 and these shafts without permitting frictional engagement to occur either between the shafts and end brackets or between the outer peripheral surface of the mass and the very near inner peripheral surface of the cylindrical casing member 11. As is discussed in further detail later herein, the hollow cylinder formed by casing 5 closely surrounds cylindrical mass 1 with only minute clearance and is of critically greater length, such that the two relatively isolated end cavities or chambers 15 and 16 tend to entrap predetermined volumes of dry compressible gas, such as air or nitrogen, with which the inner casing has been filled.

The inner casing sub-assembly 5 is fixed within an outer housing and mounting assembly 17, which is also fluid-tight to preclude loss of the compressible gas needed in the inner end cavities 15 and 16 for certain detuning and support purposes. An electrically insulating spacer 18 appears between the inner casing and outer housing, and a key 19 preserves both the inner and outer portions in a desired fixed angular relationship. External mounting bracket 20 permits the unit to be affixed to a supporting structure experiencing the accelerations which are to be detected. Support springs 6 and 7 may possess the flat spiral form pictured in FIGURE 3, wherein an outer annular portion 21 is joined with an inner coplanar annular portion 22 by an intermediate flat spiralling portion 23 which also lies in the same plane. Springs of this construction desirably possess high levels of stiffness in the radial directions indicated by arrow 24 while yet exhibiting restoring force vs. deflection characteristics of advantageously low level and slope in the transverse or axial direction represented by arrow 25. The center spring portion 22 is fastened to shaft 4 by a nut 26 while its outer portion 21 is set into and fixed with the inner casing end bracket 10, the intermediate spiral portion being otherwise unrestrained. Spring 6 is similarly mounted between the opposite support shaft 3 and end bracket 9, and it will be observed that both springs are thus disposed outside the confines of the inner casing cavities 15 and 16.

With both springs providing lateral support of the mass structure and axially centering mass 1 at the illustrated position, the cavities 15 and 16 are of substantially the same volume and the two electrical contacts 27 and 28 fastened to movable shaft 4 are normally out of engagement with the cooperating fixed electrical contacts 29 and 30, respectively, supported by the outer housing 17. The conducting support element 31 for the movable contacts is preferably made somewhat flexible to withstand large contacting forces under severe loading conditions, and the relatively fixed contacts 29 and 30 are adjustable in position through manipulation of their threaded shafts 32 and 33 mating with the output lead members 34 and 35. Lead-through insulators 36 and 37 electrically isolate the contact lead members from the housing, and the electrical output terminals 38 and 39 projecting outwardly from the housing are likewise insulated and are associated with appropriate fluid-tight seals. Contacts 29 and 30 are portrayed in an electrically intercoupled relationship established by a shunt 40, although they may be electrically isolated for certain applications of the device. Lead 41 connects with the inner casing and support spring 7, whereby the movable contacts 27 and 28 become coupled to outside circuitry through both conducting support springs 6 and 7.

With the housing bracket fastened to a supporting structure subject to accelerations, the seismic mass assembly may respond to accelerations or acceleration components appearing along the axis 8—8, including that of gravity. When not even the acceleration of gravity is experienced along this axis, as when the axis is preserved horizontal and no longitudinal accelerating forces occur, the mass 1 is urged to the illustrated central position within casing 5 by the springs 6 and 7 and the contacts 27—30 are disengaged. No frictional engagement can occur either between the inner casing and mass or between the shafts 3 and 4 and the end brackets, and the mass is thus freely suspended only through the springs. If the important effects of the air chambers 15 and 16 be neglected for the moment, it would merely be expected that with a given spring constant and fixed mass the assembly would respond rapidly to any accelerations along the sensitive axis and would close appropriate electrical contacts when a certain value of acceleration is exceeded. However, it should be noted that the spring and mass assembly also possesses natural resonant frequency of vibration along axis 8—8 governed by the ratio of the suspended mass to spring stiffness of both springs 6 and 7 in their axial directions. Shock excitation of the assembly can thus initiate periodic opening and closing of the contacts as the assembly vibrates with its natural periodicity. Further, levels of impressed vibration, or components of impressed vibration, which are of the same resonant frequency but too low in amplitude to instantaneously actuate the assembly, may ultimately force erroneous contacting by acting upon the movable assembly in a regenerative manner. These undesired responses may be suppressed by heavy damping, such as frictional damping, although such damping may reduce the instrument sensitivity very materially and the applications of the instrument must then be limited to measurement of high ranges of acceleration. Some improvement in accelerometer damping may be realized through the introduction of damping liquids into the case in which the movable suspension is positioned, or, in other arrangements, damping may be aided by causing the suspension to pump either liquid or gaseous fluids through flow restrictions such as channels, orifices, or the like. Where liquids are used, their sizeable viscosity variations with environmental temperatures may occasion intolerably large variations in damping characteristics unless resort is had to auxiliary compensators. Further, liquids act to buoy the suspended mass assembly somewhat and thereby to lessen the net effective response of the mass to accelerations, it being known that buoyed members tend to move in directions exactly opposite to those of masses under influence of accelerations. Known gaseous dampers tend to avoid the viscosity difficulties but, instead, these may unfortunately require auxiliary sources of pressurized gas or complex and undesirably stiff bellows or diaphragm structures.

In the illustrated apparatus, the gas-filled cavities 15 and 16 are advantageously formed between the inner casing 5 and the mass 1 at each end thereof, there being no additional structure required. The included gas, which also fills the various spaces appearing between the inner casing and the sealed outer housing 17 is preferably of a non-ionizing character in devices where electrical contacting is to take place, and nitrogen or dry air at atmospheric pressure has been found suitable. A typical gas damping variation of ±19% over the broad temperature range of −65° F. to 165° F. indicates that thermally-induced errors are of a distinctly minor character; in my accelerometer device these errors become of negligible consequence. An important aspect of the accelerometer gas damping is found in the frequency tuning of the gas-filled cavities to create a natural resonant frequency with the suspended mass which is at least twice that possessed by the mass with the support springs 6 and 7 alone. A relationship of five to one has been found to result in highly satisfactory performance in one design, and, in general, it is essential to avoid like or close tunings by the gas volumes and springs which would then tend to induce very highly peaked resonance vibrations of the movable mass structure. As has been mentioned earlier, such peaked amplitudes of vibrations may erroneously cause output switching actuations.

The natural resonance frequencies occasioned both by the springs and entrapped gas are of course both basically undesirable in that they can promote unwanted magnifications of exciting accelerations of the resonance frequencies. A low natural frequency is occasioned by the suspension springs if they have the low spring constants needed for very sensitive response to accelerations, although this peaking can be tolerated if adequate damping is introduced. The gas-filled assembly provides such damping, as well as other advantages, and the assembly is made substantially immune to the further natural resonance induced by the gas because this latter natural resonance is set higher than, and is preferably many times the value of, the resonant frequency of the springs and mass combination. While it might be thought that the resonance frequency of the pneumatic combination could be made indefinitely greater than that of the spring combination, thereby wholly excluding any possible interrelationships in their resonance effects, this is not permissible because the gas cavities would then become of such small volume that (a) the mass would have insufficient axial freedom of movement for detection purposes, (b) the entrapped gas volumes would be so minute that they would fail to dissipate amounts of energy sufficient to cause substantial damping, and (c) the gas volumes would be inadequate to create significant air film support and cushioning effects discussed later herein. Accordingly, in any design the maximum permissible natural resonance frequency of the mass and gas volumes combination is limited by these factors, and the corresponding minimum dimensions of the gas cavities are thus controlled by such factors.

As forces act upon mass 1 to displace it along the suspension axis 8—8, the gas filling one of the cavities 15 and 16 tends to become compressed while that in the other becomes more rarified. When the displacement is very slow, the entrapped gas is gently and slowly forced from the higher to lower pressure cavity through the elongated thin cylindrical passageway 42 formed between the outer cylindrical periphery of mass 1 and the inner cylindrical periphery of inner casing member 11, and the gas thus offers virtually no restraint to displacements under low-level continuous acceleration conditions. An opposite extreme condition, such as the application of a violent shock force along the sensitive axis, tends to cause a very rapid displacement of mass 1 which is resisted by the gas in the two cavities because the restricted high-pressure-drop passageway 42 prohibits instantaneous equalization of the pressures in the cavities. Under such a condition, the gas behaves as though somewhat "hard," although it is also desirably compressible and expansible in the two cavities and therefore possesses an advantageous resilience which softens the shock effects. By virtue of this latter action, damage to the suspension is precluded even though the sensitive flexible support springs 6 and 7 would themselves be wholly incapable of preventing violent and possibly destructive collisions between the mass and its casing. Engagements between the stops formed by ends of mass 1 and the casing end brackets 9 and 10 can ultimately occur, though with relatively little force, as shock or tremendous acceleration forces are prolonged, because the compressed gas ultimately traverses the passageway 42 to the opposite cavity. Walls of the end brackets 9 and 10 which may abut the movable mass in this way are made structurally rigid to withstand both these engagements and the exerted gas pressures.

Intermediate acceleration conditions, either continuous or vibratory in character, result in displacements of the mass which force the gas through the passageway 42 between the cavities in a manner occasioning important damping. A certain amount of damping occurs in the gas cavities themselves, as the gas therein dissipates energy while being compressed and expanded. The further damping in the passageway 42 may be very material, however, because the gas must there interact with and yield substantial losses to the large surface areas of the mass and inner cylinder walls. These combined damping actions are caused to be of predetermined values which occasion an optimum damping ratio of about 0.6, this being the ratio of the existing damping to the critical damping for the suspension. Such a damping ratio enables accurate use of the accelerometer up to a frequency about 0.8 the value of the natural resonance frequency of the mass and spring combination. In practice, the radial depth, axial length, and radial dimensions of passageway 42 are principal factors governing the value of this damping ratio in the described accelerometer. One satisfactory construction promoting these advantageous results is like that of the FIGURE 1 illustration and includes a solid right cylindrical mass of brass weighing about 100 grams and being a little over one inch in axial length and about ⅞ inch in diameter, the cylindrical inner casing member surrounding the mass being formed with an inner bore diameter minutely larger than the mass diameter, as by about 10 thousandths of an inch. The annular passageway between the mass and surrounding hollow cylinder in this example, corresponding to passageway 42, is then found to be about 5 thousandths of an inch in radial thickness, with an axial length of a little over one inch. Support shafts about 5/32 inch in diameter are given a like radial clearance of about 5 thousandths of an inch within the accommodating openings in the inner casing end brackets, and the axial clearance between each end of the cylindrical mass and the proximate inner end surface of the inner casing end bracket is a little over about 1/10 inch. With a filler gas of dry air, and with two flat spiral support springs having one readily achieved spring constant, the aforesaid construction is found to possess a low damped natural frequency of 7.2 cycles per second and to be sensitively and accurately responsive to accelerations in the range of 0.25 to 0.60 the acceleration of gravity.

A material aspect of the illustrated damping arrangement is found in the further functioning of the gas in passageway 42 as a movable gas film support for the mass within the inner casing. Low-friction air supports or bearings have been known heretofore, the movable air film being provided from an auxiliary pressurized source or pump, but in the present apparatus, the gas pressed through passageway 42 between the cavities 15 and 16 may be moved rapidly under influence of the movable mass and thereby tends to support the mass laterally. Under static conditions, this film effect does not occur and is not needed because the springs 6 and 7 furnish sufficient lateral support. However, this effect assumes importance under conditions of high vibratory acceleration, particularly when the acceleration is not exactly aligned with the sensitive axis 8—8, which misaligned relationship is most commonly experienced. It is found that such vibratory conditions tend to produce nutational movement of the supported mass structure about the suspension axis and that, in the absence of the pulsating gas film support, the mass may abrade the cylinder walls and may also tend to damage the support springs. While the springs possess a certain degree of radial stiffness, they may nevertheless be deformed in this way under high loading, and it may be noted in this connection that the spring 7 shown in FIGURE 3 has greater radial stiffness in the direction of the flat interconnecting portions 43 and 44 than elsewhere. For this reason, in addition to utilizing gas film support, the isolation from shock- and vibration-induced damage is aided by disposing the flat interconnecting portions of the two springs at opposite positions about the support axis 8—8. Referring to FIGURE 1, such positions are identified by numerals 45 and 46, and nutational movements are thus minimized because lateral supports by the two springs are equalized when nutational forces arise.

Annular clearance passages 47 and 48 about support shafts 3 and 4, respectively, are preferably of minute radial thickness, such that they essentially function as gas seals for the tuned cavities 15 and 16. These passages are required to permit the support shafts to couple with springs 6 and 7 at positions outside of the cavities, whereby the spring characteristics cannot be directly affected by the gas vibration conditions within the cavities. Further, the support springs are axially separated from the mass 1 by the mechanical barriers or stops offered by end brackets 9 and 10, which separation precludes spring damage under shock loading conditions. End brackets 9 and 10 also serve as radial shock load bearings which isolate the springs against damage as the support shafts experience wobble or nutational movements, particularly in response to severe vibration.

To this shock load bearing function promoted by the trunnions 3 and 4 in the minutely larger bearing surfaces of end brackets 9 and 10 is added a significant caging function as shocks or accelerations exceed certain levels. That is, the bearing surfaces of the trunnions and brackets tend to lock together with very large frictional resistance to relative axial movements when large forces or components of forces occur in directions essentially lateral to the direction of sensitive axis 8—8. Such locking or caging may occur as the radial stiffness of support springs 6 and 7 is overcome, and the resulting radial deflection is kept minute enough to prevent elastic limits from being exceeded and to preclude permanent deformations of the springs or alterations of their restraint and response characteristics. Caging is also preferably aided by making the radial dimension of the annular passageway 42 substantially equal to that of the radial clearance between the trunnions and end brackets, whereby substantial forces which operate in essentially lateral directions to lock the trunnions in the end brackets will substantially simultaneously lock outer cylindrical surfaces of mass 1 with inner cylindrical surfaces of casing member 11. The resulting frictional resistance to axial movements establishes a firmly caged condition which prevents damage to the sensitive device, and it will be appreciated that this caging occurs automatically, without addition of conventional accessory caging elements, and with virtually no time delay.

The suspended mass 1 is portrayed as a hollow fully-sealed cylindrical unit, although the port 49 in one end thereof may instead remain opened to alter the pneumatic resonance condition of one of the cavities, 16, to some desired value. When this is done, the other end of the mass unit must nevertheless remain essentially sealed to promote the necessary damping operations. A single design of accelerometer may be readily adapted to perform measurements in vastly different acceleration ranges through various simple combinations of three elements: the suspended mass, the support springs, and the inner casing end brackets. In the case of the mass units, these may be of one size but made of materials of different weight, or of one material of different thicknesses, as is indicated by dashed line 50 in FIGURE 1. The support springs 6 and 7 may be given special spring constants merely by shaping them from spring stock of desired thickness. And, the pneumatic resonance and damping characteristics are conveniently altered by employing end brackets 9 and 10 having walls of different thicknesses which vary the volumes of cavities 15 and 16, the dashed lines 51 and 52 being intended to represent other such positions of the inner walls of these end brackets. By way of example, the axial travel, $x$, of the spring-supported seismic mass is related to other factors as follows:

$$x = \frac{Nw}{f}$$

where, $w$ = weight of the mass
$f$ = spring constant
$N$ = fraction of gravity forces at which travel $x$ takes place.

The annular passageway damping as a fraction of critical damping is given by:

$$s = \frac{3\pi u l}{\sqrt{fM}} \times \frac{R}{d^3}$$

where $u$ = viscosity of the entrapped gas
$l$ = length of the seismic mass
$M$ = mass of the seismic mass
$f$ = spring constant
$R$ = radius of the seismic mass
$d$ = size of the gap between the mass and the sleeve.

The mechanical natural frequency of the spring and mass assembly in the system varies with factors in the expression:

$$\frac{1}{2\pi\sqrt{m/f}}$$

where, $m$ = mass of the seismic mass
$f$ = spring constant

The natural frequency of the mass and entrapped gas in the cavities should be in excess of the mechanical natural frequency, as has been discussed, and the spring constant of the entrapped gas will vary in accordance with the expression:

$$\frac{1.4A^2 p}{V}$$

where, $p$ = pressure of gas in the cavities
$V$ = volume of the mass of gas trapped in the cavities
$A$ = cross-sectional area of the seismic mass Practice of these teachings is not limited to the particular form of flat spiral spring illustrated, and other forms having radial stiffness and axial flexibility may be substituted in certain instances. Also, the detections and translations of mass displacements may be performed by signalling devices such as resistance potentiometer type slide wires and wipers or electro-magnetic pick-offs, rather than switches.

It should thus be understood that the foregoing description of preferred embodiments of the invention has been presented by way of explanation rather than limitation, and those skilled in the art will recognize that various modifications, substitutions and combinations may be made without departure in spirit or scope from the invention in its broader aspects.

What I claim as new and desire to secure by Letters Patent of the United States is:

1. Apparatus for producing output signals characterizing acceleration condition, comprising casing means defining a hollow cylinder having a relatively small central aperture through each end wall thereof, a cylindrical mass disposed coaxially within said hollow cylinder, said cylindrical mass having an outer diameter minutely smaller than the inner diameter of said cylinder and an axial length shorter than that of said cylinder by a predetermined amount, a pair of trunnions fixed collinearly with said mass and each extending through a different one of said apertures with minute clearance with said end walls to produce substantially fluid-tight sealing of said casing means, mounting means mechanically coupled between said trunnions and said casing means wholly on the outside of said casing means, said mounting means having rigidity radially about and resilience axially along the longiudinal axis of said mass and cylinder and urging said mass to an axially and radially centered relationship to said cylinder wherein said mass separates said cylinder into two cavities of predetermined volume, a dry compressible gaseous fluid filling said cavities and producing a natural resonance frequency with said mass along said axis at least twice the natural resonance frequency of said mounting means and said mass along said axis, and means measuring relative movements between said mass and casing means along said axis.

2. Apparatus for producing output signals characterizing acceleration conditions, comprising casing means defining a hollow cylinder having a relatively small aperture through each of spaced end walls thereof, a cylindrical mass disposed within said hollow cylinder, said cylindrical mass having an outer diameter minutely smaller than the inner diameter of said cylinder and an axial length shorter than that of said cylinder by a predetermined amount, a pair of trunnions fixed collinearly with said mass and each extending through a different one of said apertures with minute clearance with said end walls to produce substantially fluid-tight sealing of said cylinder, a pair of support springs each connected between a different one of said trunnions and said casing means and disposed wholly outside of said substantially sealed cylinder, said support springs each having rigidity laterally about and resilience axially along an axis and urging said mass to an axially and radially centered relationship to said cylinder wherein said mass separates said cylinder into two cavities of predetermined volume, a dry compressible gaseous fluid filling said cavities and producing a natural resonance frequency with said mass along the axis thereof at least twice the natural resonance frequency of said springs and mass along the axis of said mass, and means measuring relative axial movements between said mass and casing means.

3. Apparatus for producing output signals characterizing acceleration conditions, comprising inner casing means defining a hollow cylinder having a relatively small central aperture through each of spaced end walls thereof, a right cylindrical mass disposed coaxially within said hollow cylinder, said cylindrical mass being sealed against passage of fluid therethrough and having an outer diameter minutely smaller than the inner diameter of said cylinder and an axial length shorter than that of said cylinder by a predetermined amount, a pair of trunnions fixed collinearly with said mass and each extending through a different one of said apertures with minute clearance with said end walls to produce substantially fluid-tight sealing of said cylinder, a pair of support springs each connected between a different one of said trunnions and said casing means and disposed wholly outside of said substantially sealed cylinder, said support springs each having rigidity radially about and resilience axially along the longitudinal axis of said mass and cylinder and urging said mass to an axially and radially centered relationship to said cylinder wherein said mass separates said cylinder into two cavities of predetermined volume, a fluid-tight outer housing surrounding said inner casing and springs and trunnions, a dry compressible gaseous fluid filling said outer housing and inner casing and producing by its filling of said cavities a natural resonance frequency with said mass along said axis at least twice the natural resonance frequency of said springs and mass along said axis, and means measuring relative movements between said mass and inner casing means along said axis.

4. Apparatus for producing output signals characterizing acceleration conditions, comprising casing means defining a hollow chamber and having a relatively small central aperture through each of rigid spaced end walls thereof, an elongated mass within said chamber aligned with the longitudinal axis of said chamber and having cross-sectional dimensions minutely smaller than those of said chamber and an axial length shorter than that of said chamber by a predetermined amount, a pair of trunions fixed collinearly with said mass and each extending through a different one of said apertures with minute clearance with said end walls to produce substantially fluid-tight sealing of said chamber, said end wall surfaces bordering said apertures forming load bearing surfaces for said trunnions, support springs connected between said trunnions and casing means and disposed wholly outside said chamber, said springs having rigidity laterally about and resilience axially along said axis and urging said mass to an axially and laterally centered relationship with said chamber wherein said mass separates said chamber into two cavities of predetermined volume and said mass and trunnions are maintained out of frictional engagement with said casing means, a dry compressible gaseous fluid filling said cavities and producing a natural resonance frequency with said mass along said axis at least twice the natural resonance frequency of said springs and mass along said axis, and means measuring relative movements between said mass and casing means along said axis.

5. Apparatus for producing output signals characterizing acceleration conditions comprising casing means defining an elongated hollow cylinder having a relatively small central aperture through each end wall thereof, an elongated cylindrical mass disposed coaxially within said hollow cylinder and having an outer diameter minutely smaller than the inner diameter of said cylinder and an axial length shorter than that of said cylinder by a predetermined amount, the clearance between said elongated mass and cylinder providing a high-pressure-drop fluid passageway, a pair of trunnions fixed collinearly with said mass and each extending through a different one of said apertures with minute clearance with said end walls to produce substantially fluid-tight sealing of said cylinder, support springs coupled between said trunnions and said casing means wholly outside said hollow cylinder, said springs having rigidity radially about and resilience axially along the longitudinal axis of said mass and cylinder and urging said mass to an axially and radially centered relationship to said cylinder wherein said mass separates said cylinder into two cavities of predetermined volume, dry air filling said cavities and producing a natural resonance frequency with said mass along said axis substantially five times the natural resonance frequency of said springs and said mass along said axis, and means measuring relative movements between said mass and casing means along said axis.

6. Apparatus for producing output signals characterizing acceleration conditions, comprising casing means defining an elongated hollow cylinder having rigid end walls each having a relatively small central aperture therethrough forming a sleeve caging surface, an elongated cylindrical mass member disposed coaxially within said hollow cylinder with a predetermined minute radial clearance and having an axial length shorter than that of said cylinder by a predetermined amount, a pair of trunnions fixed collinearily with said mass member and each extending through a different one of said apertures with a minute radial clearance with said sleeve caging surfaces which is substantially the same as said predetermined radial clearance, support springs coupled between said trunnions and said casing means wholly outside said hollow cylinder, said springs having rigidity radially about and resilience axially along the longitudinal axis of said mas and cylinder and urging said mass to an axially and radially centered relationship to said cylinder wherein said mass separates said cylinder into two cavities of predetermined volume, whereby large acceleration forces acting laterally about said axis and overcoming radial stiffness of said spring means occasion both engagement of said trunnions and caging surfaces and engagement of said mass member and cylinder to cage said mass member along said axis, dry compressible gas filling said cavities and producing a natural resonance frequency with said mass along said axis greater than the natural resonance frequency of said springs and mass along said axis, and detector means responsive to relative movements between said mass and casing means along said axis.

7. Apparatus for producing output signals characterizing acceleration conditions, comprising inner casing means defining an elongated hollow cylinder having a relatively small central aperture through each end wall thereof, an elongated cylindrical mass disposed coaxially within said cylinder and having an outer diameter minutely smaller than the inner diameter of said cylinder and an axial length shorter than that of said cylinder by a predetermined amount, the clearance between said elongated mass and said cylinder providing a high-pressure-drop fluid passageway of annular cross section, a pair of trunnions fixed collinearly with said mass and each extending through a different one of said apertures with minute clearance with said end walls to produce substantially fluid-tight sealing of said cylinder, substantially planar spiral support springs coupled between said trunnions and said casing means wholly outside said hollow cylinder and urging said mass to an axially and radially centered relationship to said cylinder wherein said mass separates said cylinder into two cavities of predetermined volume, a fluid-tight outer housing surrounding said inner casing and springs and trunnions, dry gas at atmospheric pressure filling said outer housing and inner casing and producing by its filling of said predetermined volume of said cavities a natural resonance frequency with said mass along the longitudinal axis thereof substantially five times the natural resonance frequency of said springs and mass along said axis, a first electrical contact within said housing mounted for movement with one of said trunnions intermediate said housing and inner casing, and a second electrical contact fixedly mounted within said housing intermediate said housing and inner casing for electrical contacting with said first contact upon occurrence of relative movement between said mass and inner casing along said axis.

References Cited in the file of this patent

UNITED STATES PATENTS

| | | |
|---|---|---|
| 1,155,471 | Davis | Oct. 5, 1915 |
| 1,702,456 | Trumpler | Feb. 19, 1929 |
| 2,332,994 | Draper et al. | Oct. 26, 1943 |
| 2,715,680 | Tatel et al. | Aug. 16, 1955 |
| 2,788,511 | Marshall | Apr. 9, 1957 |
| 2,853,287 | Draper et al. | Sept. 23, 1958 |

FOREIGN PATENTS

| | | |
|---|---|---|
| 764,388 | Great Britain | Dec. 28, 1956 |
| 1,012,387 | France | Apr. 16, 1952 |
| 1,060,073 | France | Nov. 18, 1953 |